US012322405B2

(12) United States Patent
Eksler

(10) Patent No.: US 12,322,405 B2
(45) Date of Patent: Jun. 3, 2025

(54) METHODS AND DEVICES FOR DETECTING AN ATTACK IN A SOUND SIGNAL TO BE CODED AND FOR CODING THE DETECTED ATTACK

(71) Applicant: VOICEAGE CORPORATION, Town of Mount Royal (CA)

(72) Inventor: Vaclav Eksler, Radostin nad Oslavou (CZ)

(73) Assignee: VOICEAGE CORPORATION (CA)

( * ) Notice: Subject to any disclaimer, the term of this patent is extended or adjusted under 35 U.S.C. 154(b) by 729 days.

(21) Appl. No.: 17/602,071

(22) PCT Filed: May 1, 2020

(86) PCT No.: PCT/CA2020/050582
§ 371 (c)(1),
(2) Date: Oct. 7, 2021

(87) PCT Pub. No.: WO2020/223797
PCT Pub. Date: Nov. 12, 2020

(65) Prior Publication Data
US 2022/0180884 A1 Jun. 9, 2022

Related U.S. Application Data

(60) Provisional application No. 62/844,225, filed on May 7, 2019.

(51) Int. Cl.
*G10L 19/22* (2013.01)
*G10L 19/00* (2013.01)
(Continued)

(52) U.S. Cl.
CPC .............. *G10L 19/22* (2013.01); *G10L 25/21* (2013.01); *G10L 25/93* (2013.01);
(Continued)

(58) Field of Classification Search
CPC ..................................................... G10L 19/025
See application file for complete search history.

(56) References Cited

U.S. PATENT DOCUMENTS 6,424,936 B1 * 7/2002 Shen ..................... G10L 19/022 704/229
7,933,769 B2 4/2011 Bessette
(Continued)

FOREIGN PATENT DOCUMENTS

CN 106605263 A 4/2017
JP H10-097294 4/1998
(Continued)

OTHER PUBLICATIONS

3GPP TS 26.445; Codec for Enhanced Voice Services (EVS); Detailed Algorithmic Description; vol. 12.0.0 (Year: 2014).*
(Continued)

*Primary Examiner* — Richemond Dorvil
*Assistant Examiner* — Alexander G Marlow
(74) *Attorney, Agent, or Firm* — K&L GATES LLP

(57) ABSTRACT

A method and device for detecting an attack in a sound signal to be coded wherein the sound signal is processed in successive frames each including a number of sub-frames. The device comprises a first-stage attack detector for detecting the attack in a last sub-frame of a current frame, and a second-stage attack detector for detecting the attack in one of the sub-frames of the current frame, including the sub-frames preceding the last sub-frame. No attack is detected when the current frame is not an active frame previously classified to be coded using a generic coding mode. A method and device for coding an attack in a sound signal are also provided. The coding device comprises the above mentioned attack detecting device and an encoder of the sub-frame comprising the detected attack using a transition
(Continued)

coding mode using a glottal-shape codebook populated with glottal impulse shapes.

33 Claims, 7 Drawing Sheets

(51) Int. Cl.

| | |
|---|---|
| ***G10L 19/032*** | (2013.01) |
| ***G10L 19/12*** | (2013.01) |
| ***G10L 25/21*** | (2013.01) |
| ***G10L 25/93*** | (2013.01) |

(52) U.S. Cl.

CPC .... *G10L 2019/0002* (2013.01); *G10L 19/032* (2013.01); *G10L 19/12* (2013.01); *G10L 2025/937* (2013.01)

(56) References Cited

U.S. PATENT DOCUMENTS

| | | | | |
|---|---|---|---|---|
| 8,630,863 | B2 | 1/2014 | Son et al. | |
| 10,096,323 | B2 | 10/2018 | Sung et al. | |
| 2002/0111798 | A1* | 8/2002 | Huang | G10L 19/22 704/220 |
| 2005/0267746 | A1 | 12/2005 | Jelinek et al. | |
| 2008/0270124 | A1 | 10/2008 | Son et al. | |
| 2010/0241425 | A1 | 9/2010 | Eksler et al. | |
| 2011/0046965 | A1* | 2/2011 | Taleb | G10L 19/025 704/501 |
| 2015/0032446 | A1* | 1/2015 | Dickins | G10L 25/78 704/233 |
| 2015/0142452 | A1* | 5/2015 | Sung | G10L 19/005 704/500 |
| 2016/0006561 | A1* | 1/2016 | Radhakrishnan | G10L 19/018 375/365 |
| 2016/0050420 | A1* | 2/2016 | Helmrich | H04N 19/172 |
| 2020/0020349 | A1* | 1/2020 | Disch | G10L 19/03 |

FOREIGN PATENT DOCUMENTS

| | | | |
|---|---|---|---|
| WO | 2008/049221 | A1 | 5/2008 |
| WO | 2017/049396 | A1 | 3/2017 |

OTHER PUBLICATIONS

Václav Ecksler et al.; "Glottal-Shape Codebook to Improve Robustness of CELP Codecs"; IEEE Transactions on Audio, Speech, and Language Processing; vol. 18; No. 6; (2016); pp. 1208-1217.

Václav Ecksler et al.; "Efficient Handling of Mode Switching and Speech Transitions in the EVC Codec"; Proc. IEEE Int. Conf. on Acoustics, Speech and Signal Processing (ICASSP); (2015); pp. 5918-5921.

3GPP TS 26.445; "Codec for Enhanced Voice Services (EVS); Detailed Algorithmic Description"; vol. 12.0.0; (2014); (627 pages).

Extended European Search Report; for European Patent Application No. 20802156.8; dated Dec. 7, 2022; (11 pages).

PCT International Search Report and PCT Written Opinion for PCT International Application No. PCT/CA2020/050582; mailing date Jul. 13, 2020; (8 pages).

Codec for Enhanced Voice Services (EVS), 3GPP TS 26.445 version 15.2.0 Release 15, Mar. 2019, [retrieved May 7, 2024], internet <URL: https://www.3gpp.org/ftp//Specs/archive/26_series/26.445/26445-f20.zip>, p. 37-38, 111-113. 191-192.

Translation of Japanese Office Action for Application No. 2021-566035 dated May 8, 2024 (6 pages).

English translation of Office Action issued on Jan. 22, 2025 for Chinese Patent Application No. 2020800338153, (12 pages).

* cited by examiner

METHODS AND DEVICES FOR DETECTING AN ATTACK IN A SOUND SIGNAL TO BE CODED AND FOR CODING THE DETECTED ATTACK

CROSS REFERENCE TO RELATED APPLICATIONS

This is the national phase under 35 U.S.C. § 371 of International Application No. PCT/CA2020/050582 filed on May 1, 2020, which claims priority to and the benefit of U.S. Provisional Application No. 62/844,225 filed on May 7, 2019, the entire disclosures of each of which are incorporated by reference herein.

TECHNICAL FIELD

The present disclosure relates to a technique for coding a sound signal, for example speech or an audio signal, in view of transmitting and synthesizing this sound signal.

More specifically, but not exclusively, the present disclosure relates to methods and devices for detecting an attack in a sound signal to be coded, for example speech or an audio signal, and for coding the detected attack.

In the present disclosure and the appended claims:

- the term "attack" refers to a low-to-high energy change of a signal, for example voiced onsets (transitions from an unvoiced speech segment to a voiced speech segment), other sound onsets, transitions, plosives, etc., generally characterized by an abrupt energy increase within a sound signal segment.
- the term "onset" refers to the beginning of a significant sound event, for example speech, a musical note, or other sound;
- the term "plosive" refers, in phonetics, to a consonant in which the vocal tract is blocked so that all airflow ceases; and
- the term "coding of the detected attack" refers to the coding of a sound signal segment whose length is generally few milliseconds after the beginning of the attack.

BACKGROUND

A speech encoder converts a speech signal into a digital bit stream which is transmitted over a communication channel or stored in a storage medium. The speech signal is digitized, that is sampled and quantized with usually 16-bits per sample. The speech encoder has the role of representing these digital samples with a smaller number of bits while maintaining a good subjective speech quality. A speech decoder or synthesizer operates on the transmitted or stored digital bit stream and converts it back to a speech signal.

CELP (Code-Excited Linear Prediction) coding is one of the best techniques for achieving a good compromise between subjective quality and bit rate. This coding technique forms the basis of several speech coding standards both in wireless and wireline applications. In CELP coding, the sampled speech signal is processed in successive blocks of M samples usually called frames, where M is a predetermined number of speech samples corresponding typically to 10-30 ms. A LP (Linear Prediction) filter is calculated and transmitted every frame. The calculation of the LP filter typically needs a lookahead, for example a 5-15 ms speech segment from the subsequent frame. Each M-sample frame is divided into smaller blocks called sub-frames. Usually the number of sub-frames is two to five resulting in 4-10 ms sub-frames. In each sub-frame, an excitation is usually obtained from two components, a past excitation contribution and an innovative, fixed codebook excitation contribution. The past excitation contribution is often referred to as the pitch or adaptive codebook excitation contribution. The parameters characterizing the excitation are coded and transmitted to the decoder, where the excitation is reconstructed and supplied as input to a LP synthesis filter.

CELP-based speech codecs rely heavily on prediction to achieve their high performance. Such prediction can be of different types but usually comprises the use of an adaptive codebook storing an adaptive codebook excitation contribution selected from previous frames. A CELP encoder exploits the quasi periodicity of voiced speech by searching in the past adaptive codebook excitation contribution the segment most similar to the segment being currently coded. The same past adaptive codebook excitation contribution is also stored in the decoder. It is then sufficient for the encoder to send a pitch delay and a pitch gain for the decoder to reconstruct the same adaptive codebook excitation contribution as used in the encoder. The evolution (difference) between the previous speech segment and the currently coded speech segment is further modeled using a fixed codebook excitation contribution selected from a fixed codebook.

A problem related to prediction inherent to CELP-based speech codecs appears in the presence of transmission errors (erased frames or packets) when the state of the encoder and the state of the decoder become desynchronized. Due to prediction, the effect of an erased frame is not limited to the erased frame, but continues to propagate after the frame erasure, often during several following frames. Naturally, the perceptual impact can be very annoying. Attacks such as transitions from an unvoiced speech segment to a voiced speech segment (for example transitions between a consonant or a period of inactive speech, and a vowel) or transitions between two different voiced segments (for example transitions between two vowels) are amongst the most problematic cases for frame erasure concealment. When a transition from an unvoiced speech segment to a voiced speech segment (voiced onset) is lost, the frame right before the voiced onset frame is unvoiced or inactive and thus no meaningful excitation contribution is found in the buffer of the adaptive codebook. At the encoder, the past excitation contribution builds up in the adaptive codebook during the voiced onset frame, and the following voiced frame is coded using this past adaptive codebook excitation contribution. Most frame error concealment techniques use the information from the last correctly received frame to conceal the missing frame. When the voiced onset frame is lost, the buffer of the adaptive codebook at the decoder will be thus updated using the noise-like adaptive codebook excitation contribution of the previous frame (unvoiced or inactive frame). The periodic part (adaptive codebook excitation contribution) of the excitation is thus completely missing in the adaptive codebook at the decoder after a lost voiced onset and it can take up to several frames for the decoder to recover from this loss. A similar situation occurs in the case of lost voiced to voiced transition. In that case, the excitation contribution stored in the adaptive codebook before the transition frame has typically very different characteristics from the excitation contribution stored in the adaptive codebook after the transition. Again, as the decoder usually conceals the lost frame with the use of the past frame information, the state of the encoder and the state of the decoder will be very different, and the synthesized signal can suffer from important distortion. A solution to this problem was introduced in Reference [2] where, in a frame following the transition frame, the inter-frame dependent adaptive codebook is replaced by a non-predictive glottal-shape codebook.

Another issue when coding transition frames in CELP-based codecs is coding efficiency. When a codec processes transitions where the previous and current segment excitations are very different, the coding efficiency decreases. These instances usually occur in frames that encode attacks such as voiced onsets (transitions from an unvoiced speech segment to a voiced speech segment), other sound onsets, transitions between two different voiced segments (for example transitions between two vowels), plosives, etc. The following two issues mostly contribute to such decrease in efficiency (Reference mostly [1]). As a first issue, efficiency of the long-term prediction is poor and, thus, contribution of the adaptive codebook excitation contribution to the total excitation is weak. A second issue is related to the gain quantizers, often designed as vector quantizers using a limited bit-budget, which are usually not able to adequately react to an abrupt energy increase within a frame. The more this abrupt energy increase occurs close to the end of a frame, the more critical the second issue is.

To overcome the above-discussed issues, there is a need for a method and device for improving the coding efficiency of frames including attacks such as onset frames and transition frames and, more generally, to improve coding quality in CELP-based codecs.

SUMMARY

According to a first aspect, the present disclosure relates to a method for detecting an attack in a sound signal to be coded wherein the sound signal is processed in successive frames each including a number of sub-frames. The method comprises a first-stage attack detection for detecting the attack in a last sub-frame of a current frame, and a second-stage attack detection for detecting the attack in one of the sub-frames of the current frame, including the sub-frames preceding the last sub-frame.

The present disclosure also relates to a method for coding an attack in a sound signal, comprising the above-defined attack detecting method. The coding method comprises encoding the sub-frame comprising the detected attack using a coding mode with a non-predictive codebook.

According to another aspect, the present disclosure is concerned with a device for detecting an attack in a sound signal to be coded wherein the sound signal is processed in successive frames each including a number of sub-frames. The device comprises a first-stage attack detector for detecting the attack in a last sub-frame of a current frame, and a second-stage attack detector for detecting the attack in one of the sub-frames of the current frame, including the sub-frames preceding the last sub-frame.

The present disclosure is further concerned with a device for coding an attack in a sound signal, comprising the above-defined attack detecting device and an encoder of the sub-frame comprising the detected attack using a coding mode with a non-predictive codebook.

The foregoing and other objects, advantages and features of the methods and devices for detecting an attack in a sound signal to be coded and for coding the detected attack will become more apparent upon reading of the following non-restrictive description of illustrative embodiments thereof, given by way of example only with reference to the accompanying drawings.

DETAILED DESCRIPTION

Although the non-restrictive illustrative embodiments of the methods and devices for detecting an attack in a sound signal to be coded and for coding the detected attack will be described in the following description in connection with a speech signal and a CELP-based codec, it should be kept in mind that these methods and devices are not limited to an application to speech signals and CELP-based codecs but their principles and concepts can be applied to any other types of sound signals and codecs.

The following description is concerned with detecting an attack in a sound signal, for example speech or an audio signal, and forcing a Transition Coding (TC) mode in sub-frames where an attack is detected. The detection of an attack may also be used for selecting a sub-frame in which a glottal-shape codebook, as part of the TC coding mode, is employed in the place of an adaptive codebook.

In the EVS codec as described in Reference [4], when a detection algorithm detects an attack in the last sub-frame of a current frame, a glottal-shape codebook of the TC coding mode is used in this last sub-frame. In the present disclosure, the detection algorithm is complemented with a second-stage logic to not only detect a larger number of frames including an attack but also, upon coding of such frames, to force the use of the TC coding mode and corresponding glottal-shape codebook in all sub-frames in which an attack is detected.

The above technique improves coding efficiency of not only attacks detected in a sound signal to be coded but, also, of certain music segments (e.g. castanets). More generally, coding quality is improved.

Figure 1:
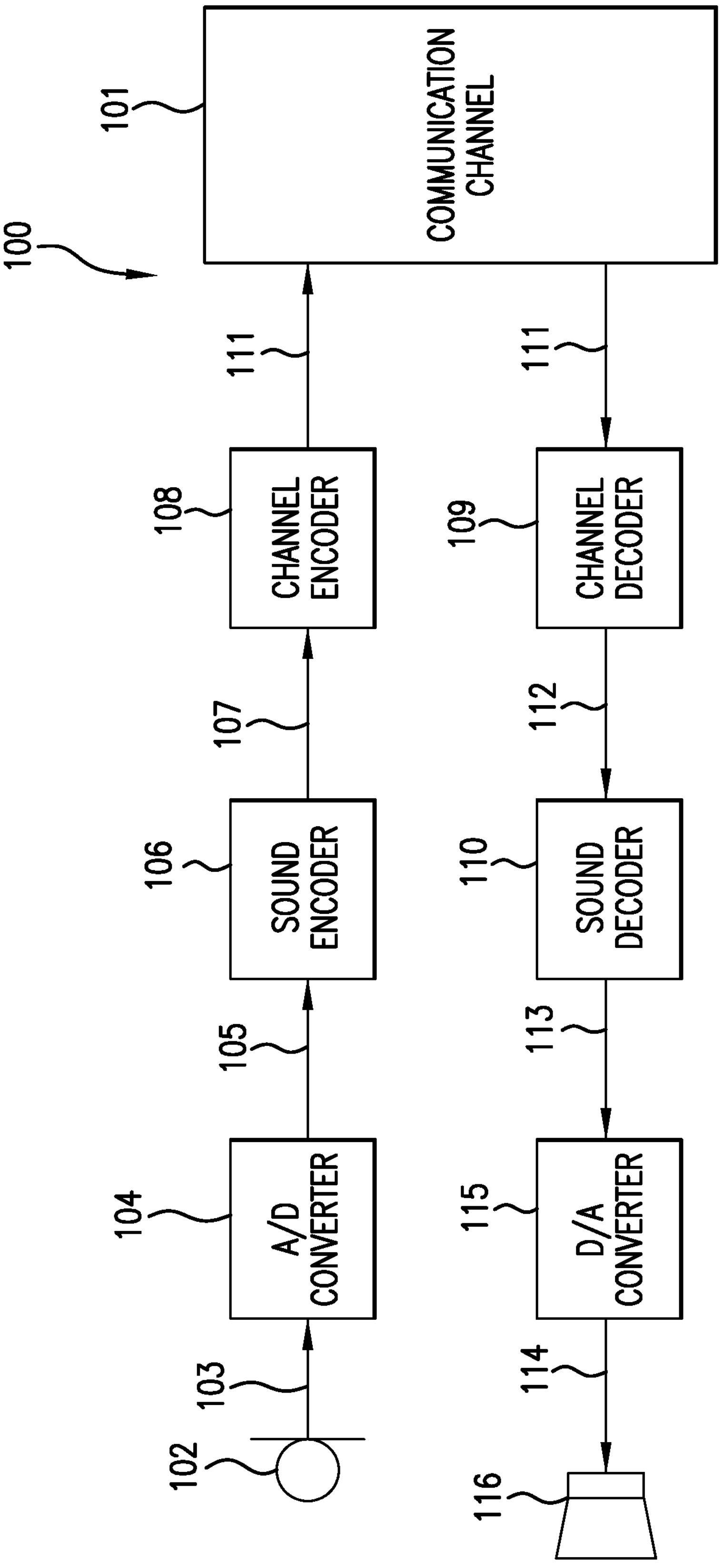
FIG. 1 is a schematic block diagram of a sound processing and communication system depicting a possible context of implementation of the methods and devices for detecting an attack in a sound signal to be coded and for coding the detected attack.

FIG. 1 is a schematic block diagram of a sound processing and communication system 100 depicting a possible context of implementation of the methods and devices for detecting an attack in a sound signal to be coded and for coding the detected attack as disclosed in the following description.

The sound processing and communication system 100 of FIG. 1 supports transmission of a sound signal across a communication channel 101. The communication channel 101 may comprise, for example, a wire or an optical fiber link. Alternatively, the communication channel 101 may comprise at least in part a radio frequency link. The radio frequency link often supports multiple, simultaneous communications requiring shared bandwidth resources such as may be found with cellular telephony. Although not shown, the communication channel 101 may be replaced by a storage device in a single device implementation of the system 100 that records and stores the encoded sound signal for later playback.

Still referring to FIG. 1, for example a microphone 102 produces an original analog sound signal 103. As indicated in the foregoing description, the sound signal 103 may comprise, in particular but not exclusively, speech and/or audio.

The analog sound signal 103 is supplied to an analog-to-digital (ND) converter 104 for converting it into an original digital sound signal 105. The original digital sound signal 105 may also be recorded and supplied from a storage device (not shown).

A sound encoder 106 encodes the digital sound signal 105 thereby producing a set of encoding parameters that are multiplexed under the form of a bit stream 107 delivered to an optional error-correcting channel encoder 108. The optional error-correcting channel encoder 108, when present, adds redundancy to the binary representation of the encoding parameters in the bit stream 107 before transmitting the resulting bit stream 111 over the communication channel 101.

On the receiver side, an optional error-correcting channel decoder 109 utilizes the above mentioned redundant information in the received digital bit stream 111 to detect and correct errors that may have occurred during transmission over the communication channel 101, producing an error-corrected bit stream 112 with received encoding parameters. A sound decoder 110 converts the received encoding parameters in the bit stream 112 for creating a synthesized digital sound signal 113. The digital sound signal 113 reconstructed in the sound decoder 110 is converted to a synthesized analog sound signal 114 in a digital-to-analog (D/A) converter 115.

The synthesized analog sound signal 114 is played back in a loudspeaker unit 116 (the loudspeaker unit 116 can obviously be replaced by a headphone). Alternatively, the digital sound signal 113 from the sound decoder 110 may also be supplied to and recorded in a storage device (not shown).

As a non-limitative example, the methods and devices for detecting an attack in a sound signal to be coded and for coding the detected attack according to the present disclosure can be implemented in the sound encoder 106 and decoder 110 of FIG. 1. It should be noted that the sound processing and communication system 100 of FIG. 1, along with the methods and devices for detecting an attack in a sound signal to be coded and for coding the detected attack, can be extended to cover the case of stereophony where the input of the encoder 106 and the output of the decoder 110 consist of left and right channels of a stereo sound signal. The sound processing and communication system 100 of FIG. 1, along with the methods and devices for detecting an attack in a sound signal to be coded and for coding the detected attack, can be further extended to cover the case of multi-channel and/or scene-based audio and/or independent streams encoding and decoding (e.g. surround and high-order ambisonics).

Figure 2:
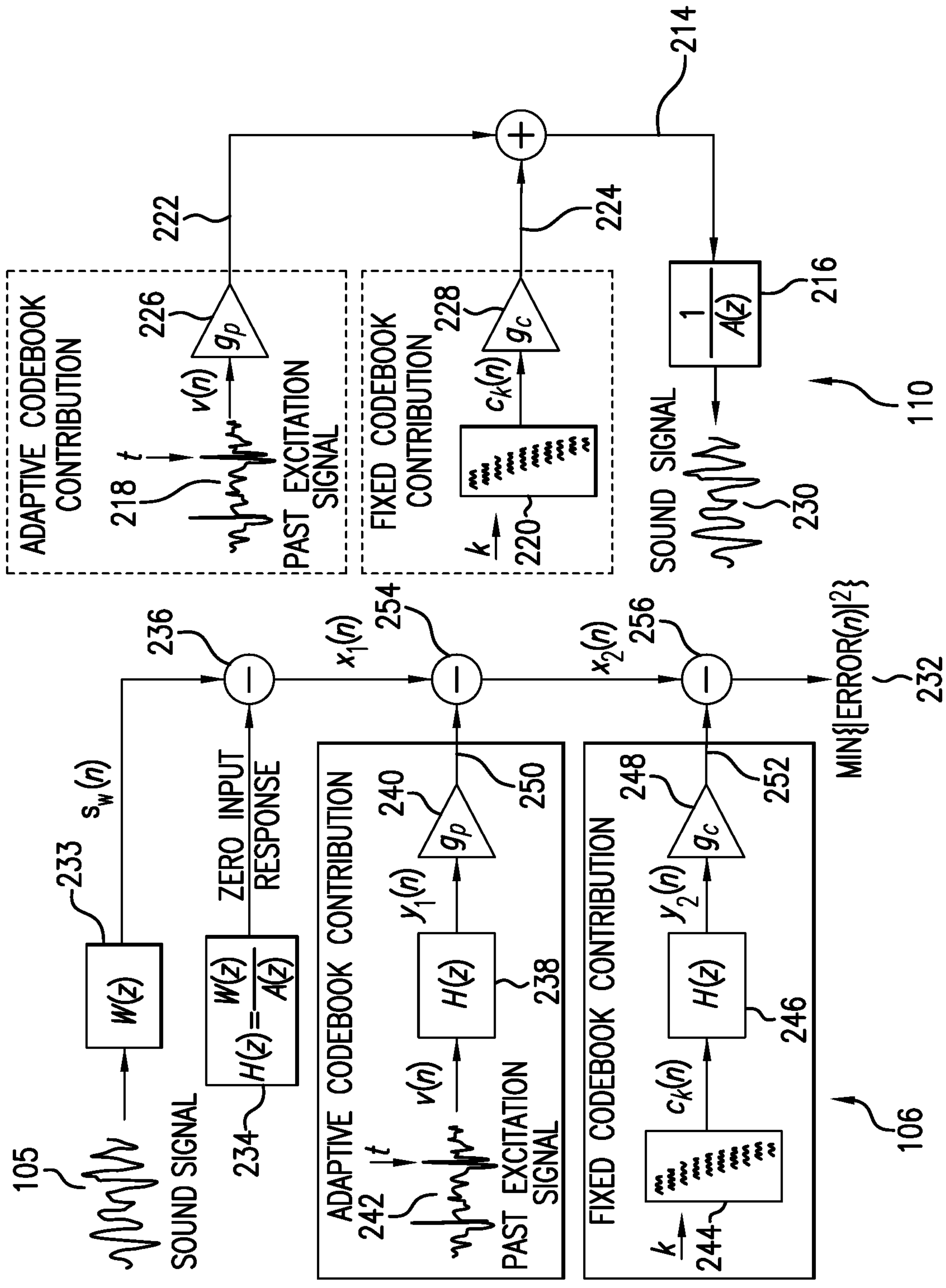
FIG. 2 is a schematic block diagram illustrating the structure of a CELP-based encoder and decoder, forming part of the sound processing and communication system of FIG. 1.

FIG. 2 is a schematic block diagram illustrating the structure of a CELP-based encoder and decoder which, according to the illustrative embodiments, is part of the sound processing and communication system 100 of FIG. 1. As illustrated in FIG. 2, a sound codec comprises two basic parts: the sound encoder 106 and the sound decoder 110 both introduced in the foregoing description of FIG. 1. The encoder 106 is supplied with the original digital sound signal 105, determines the encoding parameters 107, described herein below, representing the original analog sound signal 103. These parameters 107 are encoded into the digital bit stream 111. As already explained, the bit stream 111 is transmitted using a communication channel, for example the communication channel 101 of FIG. 1, to the decoder 110. The sound decoder 110 reconstructs the synthesized digital sound signal 113 to be as similar as possible to the original digital sound signal 105.

Presently, the most widespread speech coding techniques are based on Linear Prediction (LP), in particular CELP. In LP-based coding, the synthesized digital sound signal 230 (FIG. 2) is produced by filtering an excitation 214 through a LP synthesis filter 216 having a transfer function 1/A(z). An example of procedure to find the filter parameters A(z) of the LP filter can be found in Reference [4].

In CELP, the excitation 214 is typically composed of two parts: a first-stage, adaptive-codebook contribution 222 produced by selecting a past excitation signal v(n) from an adaptive codebook 218 in response to an index t (pitch lag) and by amplifying the past excitation signal v(n) by an adaptive-codebook gain $g_p$ 226 and a second-stage, fixed-codebook contribution 224 produced by selecting an innovative codevector $c_k(n)$ from a fixed codebook 220 in response to an index k and by amplifying the innovative codevector $c_k(n)$ by a fixed-codebook gain $g_c$ 228. Generally speaking, the adaptive codebook contribution 222 models the periodic part of the excitation and the fixed codebook excitation contribution 224 is added to model the evolution of the sound signal.

The sound signal is processed by frames of typically 20 ms and the filter parameters A(z) of the LP filter are transmitted from the encoder 106 to the decoder 110 once per frame. In CELP, the frame is further divided in several sub-frames to encode the excitation. The sub-frame length is typically 5 ms.

CELP uses a principle called Analysis-by-Synthesis where possible decoder outputs are tried (synthesized) already during the coding process at the encoder 106 and then compared to the original digital sound signal 105. The encoder 106 thus includes elements similar to those of the decoder 110. These elements includes an adaptive codebook excitation contribution 250 (corresponding to the adaptive-codebook contribution 222 at the decoder 110) selected in response to the index t (pitch lag) from an adaptive codebook 242 (corresponding to the adaptive codebook 218 at the decoder 110) that supplies a past excitation signal v(n) convolved with the impulse response of a weighted synthesis filter H(z) 238 (cascade of the LP synthesis filter 1/A(z) and a perceptual weighting filter W(z)), the output $y_1(n)$ of which is amplified by an adaptive-codebook gain $g_p$ 240 (corresponding to the adaptive-codebook gain 226 at the decoder 110). These elements also include a fixed codebook excitation contribution 252 (corresponding to the fixed-codebook contribution 224 at the decoder 110) selected in response to the index k from a fixed codebook 244 (corresponding to the fixed codebook 220 at the decoder 110) that supplies an innovative codevector $c_k(n)$ convolved with the impulse response of the weighted synthesis filter H(z) 246, the output $y_2(n)$ of which is amplified by a fixed codebook gain $g_c$ 248 (corresponding to the fixed-codebook gain 228 at the decoder 110).

The encoder 106 comprises the perceptual weighting filter W(z) 233 and a calculator 234 of a zero-input response of the cascade (H(z)) of the LP synthesis filter 1/A(z) and the perceptual weighting filter W(z). Subtractors 236, 254 and 256 respectively subtract the zero-input response from calculator 234, the adaptive codebook contribution 250 and the fixed codebook contribution 252 from the original digital sound signal 105 filtered by the perceptual weighting filter 233 to provide an error signal used to calculate a mean-squared error 232 between the original digital sound signal 105 and the synthesized digital sound signal 113 (FIG. 1).

The adaptive codebook 242 and the fixed codebook 244 are searched to minimize the mean-squared error 232 between the original digital sound signal 105 and the synthesized digital sound signal 113 in a perceptually weighted domain, where discrete time index n=0, 1, . . . , N−1, and N is the length of the sub-frame. Minimization of the mean-squared error 232 provides the best candidate past excitation signal v(n) (identified by the index t) and innovative codevector $c_k(n)$ (identified by the index k) for coding the digital sound signal 105. The perceptual weighting filter W(z) exploits the frequency masking effect and typically is derived from the LP filter A(z). An example of perceptual weighting filter W(z) for WB (wideband, bandwidth of typically 50-7000 Hz) signals can be found in Reference [4].

Since the memory of the LP synthesis filter 1/A(z) and the weighting filter W(z) is independent from the searched innovative codevector $c_k(n)$, this memory (zero-input response of the cascade (H(z)) of the LP synthesis filter 1/A(z) and the perceptual weighting filter W(z)) can be subtracted (subtractor 236) from the original digital sound signal 105 prior to the fixed codebook search. Filtering of the candidate innovative codevector $c_k(n)$ can then be done by means of a convolution with the impulse response of the cascade of the filters 1/A(z) and W(z), represented by H(z) in FIG. 2.

The digital bit stream 111 transmitted from the encoder 106 to the decoder 110 contains typically the following parameters 107: quantized parameters of the LP filter A(z), index t of the adaptive codebook 242 and index k of the fixed codebook 244, and the gains $g_p$ 240 and $g_c$ 248 of the adaptive codebook 242 and of the fixed codebook 244. In the decoder 110:

- the received quantized parameters of the LP filter A(z) are used to build the LP synthesis filter 216;
- the received index t is applied to the adaptive codebook 218;
- the received index k is applied to the fixed codebook 220;
- the received gain $g_p$ is used as adaptive-codebook gain 226; and
- the received gain $g_c$ is used as fixed-codebook gain 228.

Further explanations on the structure and operation of CELP-based encoder and decoder can be found, for example, in Reference [4].

Also, although the following description makes reference to the EVS Standard (Reference [4]), it should be kept in mind that the concepts, principles, structures and operations as described therein may be applied to other sound/speech processing and communication Standards.

Coding of Voiced Onsets

To obtain better coding performance, the LP-based core of the EVS codec as described in Reference [4] uses a signal classification algorithm and six (6) distinct coding modes tailored for each category of signal, namely the Inactive Coding (IC) mode, Unvoiced Coding (UC) mode, Transition Coding (TC) mode, Voiced Coding (VC) mode, Generic Coding (GC) mode, and Audio Coding (AC) mode (not shown).

Figure 3:
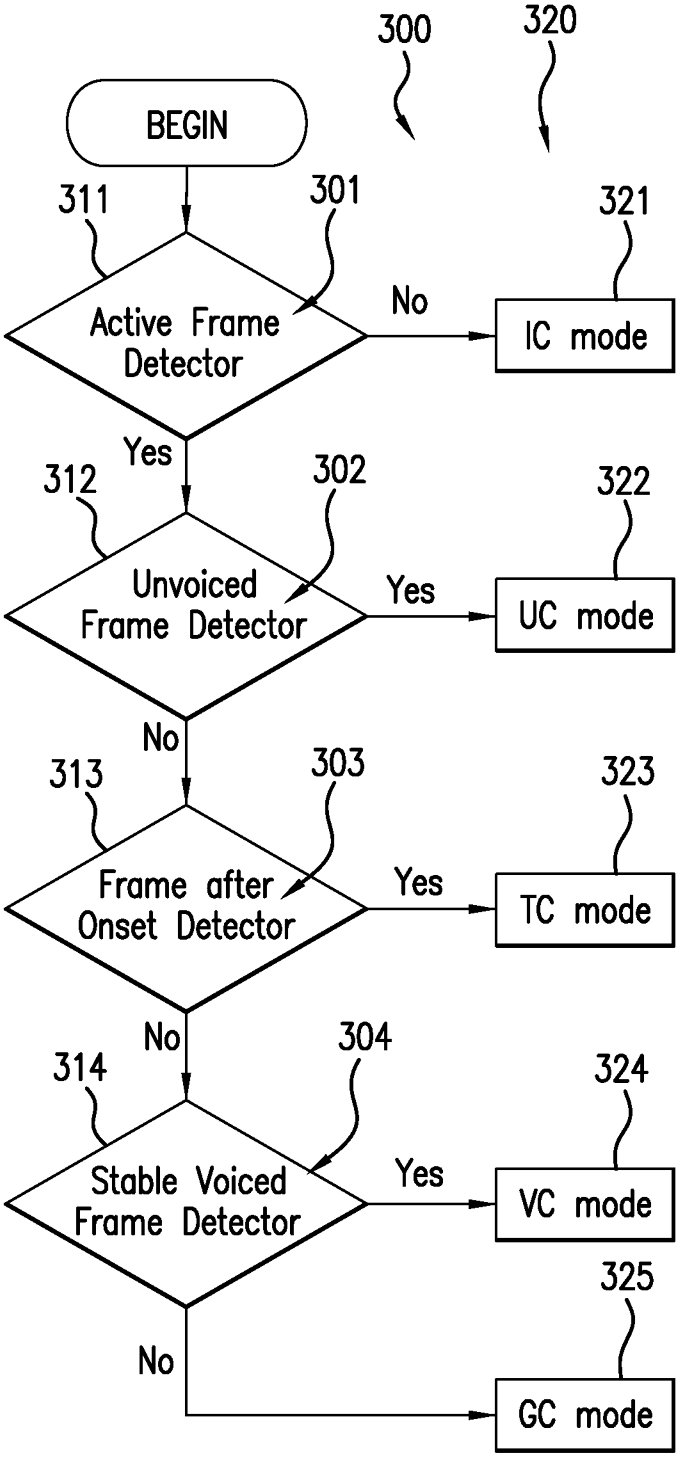
FIG. 3 is a block diagram illustrating concurrently the operations of an EVS (Enhanced Voice Services) coding mode classifying method and the modules of an EVS coding mode classifier.

FIG. 3 is a simplified high-level block diagram illustrating concurrently the operations of an EVS coding mode classifying method 300 and the modules of an EVS coding mode classifier 320.

Referring to FIG. 3, the coding mode classifying method 300 comprises an active frame detection operation 301, an invoiced frame detection operation 302, a frame after onset detection operation 303 and a stable voiced frame detection operation 304.

To perform the active frame detection operation 301, an active frame detector 311 determines whether the current frame is active or inactive. For that purpose, sound activity detection (SAD) or voice activity detection (VAD) can be used. If an inactive frame is detected, the IC coding mode 321 is selected and the procedure is terminated.

If the detector 311 detects an active frame during the active frame detection operation 301, the unvoiced frame detection operation 302 is performed using an unvoiced frame detector 312. Specifically, if an unvoiced frame is detected, the unvoiced frame detector 312 selects, to code the detected unvoiced frame, the UC coding mode 322. The UC coding mode is designed to code unvoiced frames. In the UC coding mode, the adaptive codebook is not used and the excitation is composed of two vectors selected from a linear Gaussian codebook. Alternatively, the coding mode in UC may be composed of a fixed algebraic codebook and a Gaussian codebook.

If the current frame is not classified as unvoiced by the detector 312, the frame after onset detection operation 303 and a corresponding frame after onset detector 313, and the stable voiced frame detection operation 304 and a corresponding stable voiced frame detector 314 are used.

In the frame after onset detection operation 303, the detector 313 detects voiced frames following voiced onsets and selects the TC coding mode 323 to code these frames. The TC coding mode 323 is designed to enhance the codec performance in the presence of frame erasures by limiting the usage of past information (adaptive codebook). To minimize at the same time the impact of the TC coding mode 323 on a clean channel performance (without frame erasures), mode 323 is used only on the most critical frames from a frame erasure point of view. These most critical frames are voiced frames following voiced onsets.

If the current frame is not a voiced frame following a voiced onset, the stable voiced frame detection operation 304 is performed. During this operation, the stable voiced frame detector 314 is designed to detect quasi-periodic stable voiced frames. If the current frame is detected as a quasi-periodic stable voiced frame, the detector 314 selects the VC coding mode 324 to encode the stable voiced frame. The selection of the VC coding mode by the detector 314 is conditioned by a smooth pitch evolution. This uses Algebraic Code-Excited Linear Prediction (ACELP) technology, but given that the pitch evolution is smooth throughout the frame, more bits are assigned to the fixed (algebraic) codebook than in the GC coding mode.

If the current frame is not classified into one of the above frame categories during the operations 301-304, this frame is likely to contain a non-stationary speech segment and the detector 314 selects, for encoding such frame, the GC coding mode 325, for example a generic ACELP coding mode.

Finally, a speech/music classification algorithm (not shown) of the EVS Standard is run to decide whether the current frame shall be coded using the AC mode. The AC mode has been designed to efficiently code generic audio signals, in particular but not exclusively music.

In order to improve codec's performance for noisy channels, a refinement of the coding mode classification method described in the previous paragraphs with reference to FIG. 3, called frame classification for Frame Error Concealment (FEC) is applied (Reference [4]). The basic idea behind using a different frame classification approach for FEC is the fact that an ideal strategy for FEC should be different for quasi-stationary speech segments and for speech segments with rapidly changing characteristics. In the EVS Standard (Reference [4]), the frame classification for FEC used at the encoder defines five (5) distinct classes as follows. UNVOICED class comprises all unvoiced speech frames and all frames without active speech. A voiced offset frame can also be classified as UNVOICED class if its end tends to be unvoiced. UNVOICED TRANSITION class comprises unvoiced frames with a possible voiced onset at the end of the frame. VOICED TRANSITION class comprises voiced frames with relatively weak voiced characteristics. VOICED class comprises voiced frames with stable characteristics. ONSET class comprises all voiced frames with stable characteristics following a frame classified as UNVOICED class or UNVOICED TRANSITION class.

Further explanations on the EVS coding mode classifying method 300 and the EVS coding mode classifier 320 of FIG. 3 can be found, for example, in Reference [4].

Originally, the TC coding mode was introduced to be used in frames following a transition for helping to stop error propagation in case a transition frame is lost (Reference [4]). In addition, the TC coding mode can be used in transition frames to increase coding efficiency. In particular, just before a voiced onset, the adaptive codebook usually contains a noise-like signal not very useful or efficient for coding the beginning of a voiced segment. The goal is to supplement the adaptive codebook with a better, non-predictive codebook populated with simplified quantized versions of glottal impulse shapes to encode the voiced onsets. The glottal-shape codebook is used only in one sub-frame containing the first glottal impulse within the frame, more precisely in the sub-frame where the LP residual signal ($s_w(n)$ in FIG. 2) has its maximum energy within the first pitch period of the frame. Further explanations on the TC coding mode of FIG. 3 can be found, for example, in Reference [4].

The present disclosure proposes to further extend the EVS concept of coding voiced onsets using the glottal-shape codebook of the TC coding mode. When an attack occurs towards the end of a frame, it is proposed to force as much as possible use of the bit-budget (number of available bits) for coding the excitation toward the end of the frame, since coding of the preceding part of the frame (sub-frames before the sub-frame including the attack) with a low number of bits is sufficient. A difference with the TC coding mode of EVS as described in Reference [4] is that the glottal-shape codebook is usually used in the last sub-frame(s) within the frame, independently of the real maximum energy of the LP residual signal within the first pitch period of the frame.

By forcing most of the bit-budget for encoding the end of the frame, the waveform of the sound signal at the beginning of the frame might not be well modeled, especially at low bit-rates where the fixed codebook is formed of, for example, one or two pulses per sub-frame only. However, the human ear sensitivity is exploited here. The human ear is not much sensitive to an inaccurate coding of a sound signal before an attack, but much more sensitive to any imperfection in coding a sound signal segment, for example a voiced segment, after such attack. By forcing a larger number of bits to construct an attack, the adaptive codebook in subsequent sound signal frames is more efficient because it benefits from the past excitation corresponding to the attack segment that is well modeled. The subjective quality is consequently improved.

The present disclosure proposes a method for detecting an attack and a corresponding attack detector which operates on frames to be coded with the GC coding mode to determine if these frames should be encoded with the TC coding mode. Specifically, when an attack is detected, these frames are coded using the TC coding mode. Thus, the relative number of frames coded using the TC coding mode increases. Moreover, as the TC coding mode does not use the past excitation, the intrinsic robustness of the codec against frame erasures is increased with this approach.

Attack Detecting Method and Attack Detector

Figure 4:
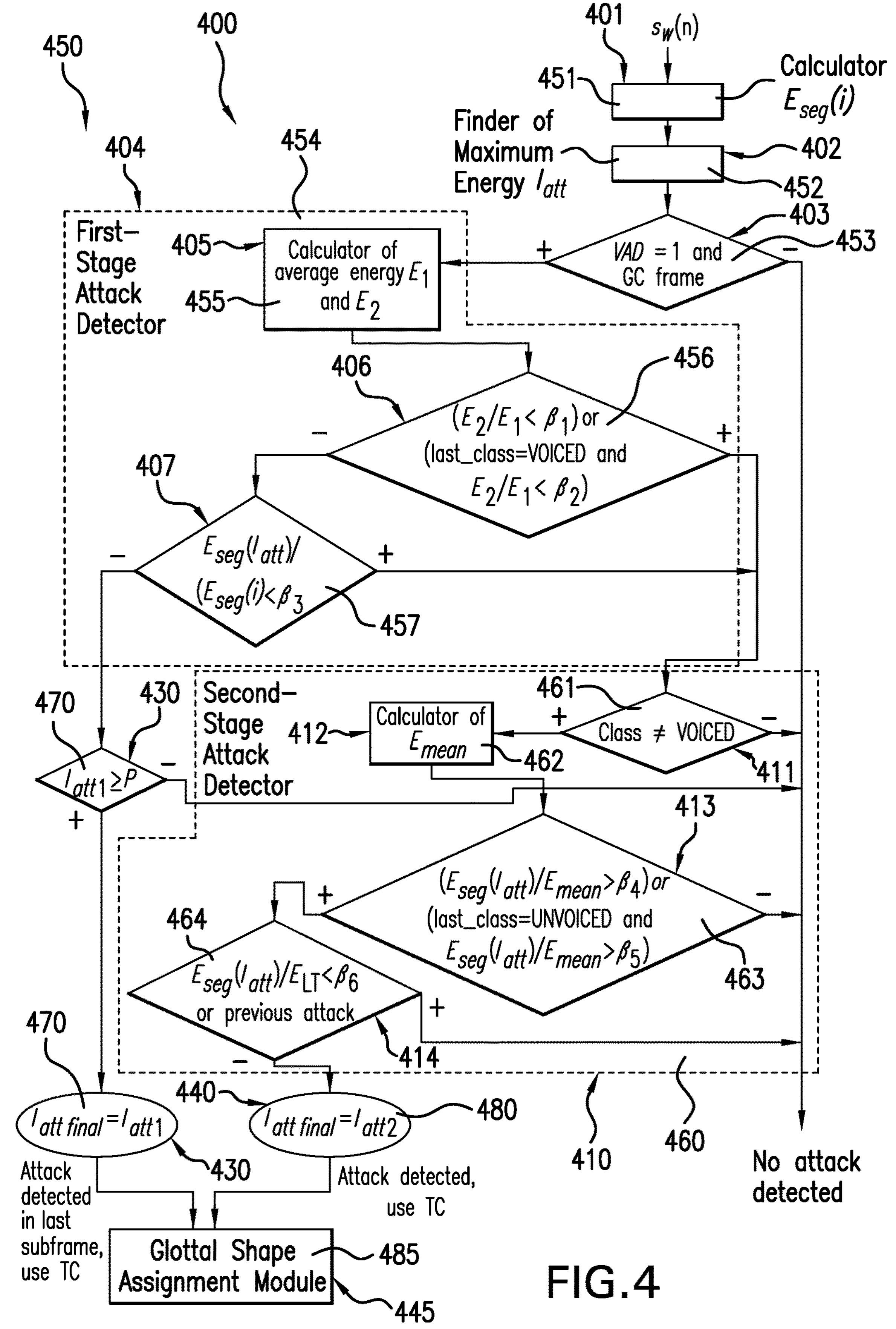
FIG. 4 is a block diagram illustrating concurrently the operations of a method for detecting an attack in a sound signal to be coded and the modules of an attack detector for implementing the method.

FIG. 4 is a block diagram illustrating concurrently the operations of an attack detecting method 400 and the modules of an attack detector 450.

The attack detecting method 400 and attack detector 450 properly select frames to be coded using the TC coding mode. The following description describes, in connection with FIG. 4, an example of attack detecting method 400 and attack detector 450 that can be used in a codec, in this illustrative example, a CELP codec with an internal sampling rate of 12.8 kbps and with a frame having a length of 20 ms and composed of four (4) sub-frames. An example of such codec is the EVS codec (Reference [4]) at lower bit-rates 13.2 kbps). An application to other types of codecs, with different internal bit-rates, frame lengths and numbers of sub-frames can also be contemplated.

The detection of attacks starts with a preprocessing where energies in several segments of the input sound signal in the current frame are calculated, followed by a detection performed sequentially in two stages and by a final decision. The first-stage detection is based on comparing calculated energies in the current frame while the second-stage detection takes into account also past frame energy values.

Energies of Segments

In an energy calculating operation 401 of FIG. 4, an energy calculator 451 calculate energy in a plurality of successive analysis segments of the perceptually weighted, input sound signal $s_w(n)$, where $n=0, \ldots, N-1$, and where Nis the length of the frame in samples. To calculate such energy, the calculator 451 may use, for example, the following Equation (1):

$$E_{seg}(i) = \sum_{k=0}^{K-1} s_w^2(i \cdot K + k),\ i = 0, \ldots, (N/K) - 1, \tag{1}$$

where K is the length in samples of the analysis sound signal segment, i is the index of the segment, and N/K is the total number of segments. In the EVS Standard operating at an internal sampling rate of 12.8 kbps, the length of the frame is N=256 samples and the length of the segment can be set to, for example, K=8 which results in a total number of N/K=32 analysis segments. Thus, segments i=0, . . . , 7 correspond to the first sub-frame, segments i=8, . . . , 15 to the second sub-frame, segments i=16, . . . , 23 to the third sub-frame, and finally segments i=24, . . . , 31 to the last (fourth) sub-frame of the current frame. In the non-limitative illustrative example of Equation (1), the segments are consecutive. In another possible embodiment, partially overlapping segments can be employed.

Next, in a maximum energy segment finding operation 402, a maximum energy segment finder 452 finds the segment i with maximum energy. For that purpose, the finder 452 may use, for example, the following Equation (2):

$$I_{att} = \max_i(E_{seg}(i)),\ i = 0, \ldots, (N/K) - 1 \tag{2}$$

The segment with maximum energy represents the position of a candidate attack which is validated in the following two stages (herein after first-stage and second-stage).

In the illustrative embodiments, given as example in the present description, only active frames (VAD=1, where local VAD is considered in the current frame) previously classified for being processed using the GC coding mode are subject to the following first-stage and second-stage attack detection. Further explanations on VAC (Voice Activity Detection) can be found, for example, in Reference [4]. In a decision operation 403, a decision module 453 determines if VAD=1 and the current frame has been classified for being processed using the GC coding mode. If yes, the first-stage attack detection is performed on the current frame. Otherwise, no attack is detected and the current frame is processed according to its previous classification as shown in FIG. 3.

Both speech and music frames can be classified in the GC coding mode and, therefore, attack detection is applied in coding not only speech signals but general sound signals.

First-Stage Attack Detection

The first-stage attack detection operation 404 and the corresponding first-stage attack detector 454 will now be described with reference to FIG. 4.

The first-stage attack detection operation 404 comprises an average energy calculating operation 405. To perform operation 405, the first-stage attack detector 454 comprises a calculator 455 of an average energy across the analysis segments before the last sub-frame in the current frame using, for example, the following Equation (3):

$$E_1 = \frac{1}{P}\sum_{i=0}^{P-1} E_{seg}(i) \tag{3}$$

where P is the number of segments before the last sub-frame. In the non-limitative, example implementation, where N/K=32, parameter P is equal to 24.

Similarly, in average energy calculating operation 405, the calculator 455 calculates an average energy across the analysis segments starting with segment $I_{att}$ to the last segment of the current frame, using as an example the following Equation (4):

$$E_2 = \frac{1}{(N/K) - I_{att}} \sum_{i=I_{att}}^{(N/K)-1} E_{seg}(i). \tag{4}$$

The first-stage attack detection operation 404 further comprises a comparison operation 406. To perform the comparison operation 406, the first-stage attack detector 454 comprises a comparator 456 for comparing the ratio of the average energy $E_1$ from Equation (3) and the average energy $E_2$ from Equation (4) to a threshold depending on the signal classification of the previous frame, denoted as "last_class", performed by the above discussed frame classification for Frame Error Concealment (FEC) (Reference [4]). The comparator 456 determines an attack position from the first-stage attack detection, $I_{att1}$, using as a non-limitative example, the following logic of Equation (5):

$$\begin{aligned} &\text{if} \\ &\left\{\left(\frac{E_2}{E_1} < \beta_1\right) \text{ OR } \left(\left(\frac{E_2}{E_1} < \beta_2\right) \text{ AND (last\_class = VOICED)}\right)\right\} \\ &\text{then } I_{att1} = 0 \\ &\text{otherwise } I_{att1} = I_{att} \end{aligned} \tag{5}$$

where $\beta_1$ and $\beta_2$ are thresholds that can be set, according to the non-limitative example, to $\beta_1=8$ and $\beta_2=20$, respectively. When $I_{att1}=0$, no attack is detected. Using the logic of Equation (5), all attacks that are not sufficiently strong are eliminated.

In order to further reduce the number of falsely detected attacks, the first-stage attack detection operation 404 further comprises a segment energy comparison operation 407. To perform the segment energy comparison operation 407, the first-stage attack detector 454 comprises a segment energy comparator 457 for comparing the segment with maximum energy $E_{seg}(I_{att})$ with the energy $E_{seg}(I)$ of the other analysis segments of the current frame. Thus, if $I_{att1}>0$ as determined by the operation 406 and comparator 456, the comparator 457 performs, as a non-limitative example, the comparison of Equation (6) for i=2, . . . , P−3:

$$\text{if } \left\{\frac{E_{seg}(I_{att})}{E_{seg}(i)} < \beta_3\right\} \text{ then } I_{att1} = 0 \tag{6}$$

where threshold $\beta_3$ is determined experimentally so as to reduce as much as possible falsely detected attacks without impeding on the efficiency of detection of true attacks. In a non-limitative experimental implementation, the threshold $\beta_3$ is set to 2. Again, when $I_{att1}=0$, no attack is detected.

Second-Stage Attack Detection

The second-stage attack detection operation 410 and the corresponding second-stage attack detector 460 will now be described with reference to FIG. 4.

The second-stage attack detection operation 410 comprises a voiced class comparison operation 411. To perform the voiced class comparison operation 411, the second-stage attack detector 460 comprises a voiced class decision module 461 to get information from the above discussed EVS FEC classifying method to determine whether the current frame class is VOICED or not. If the current frame class is VOICED, the decision module 461 outputs the decision that no attack is detected.

If an attack was not detected in the first-stage attack detection operation 404 and first-stage attack detector 454 (specifically the comparison operation 406 and comparator 456 or the comparison operation 407 and comparator 457), i.e. $I_{att1}=0$, and the class of the current frame is other than VOICED, then the second-stage attack detection operation 410 and the second-stage attack detector 460 are applied.

The second-stage attack detection operation 410 comprises a mean energy calculating operation 412. To perform operation 412, the second-stage attack detector 460 comprises a mean energy calculator 462 for calculating a mean energy across N/K analysis segments before the candidate attack $I_{att}$—including segments from the previous frame—using for example Equation (7):

$$E_{mean} = \frac{1}{N/K}\left(\sum_{i=I_{att}}^{(N/K)-1} E_{seg,past}(i) + \sum_{i=0}^{I_{att}-1} E_{seg}(i)\right) \quad (7)$$

where $E_{seg,past}(i)$ are energies per segments from the previous frame.

The second-stage attack detection operation 410 comprises a logic decision operation 413. To perform operation 413, the second-stage attack detector 460 comprises a logic decision module 463 to find an attack position from the second-stage attack detector, $I_{att2}$, by applying, for example, the following logic of Equation (8) to the mean energy from Equation (7):

$$\text{if } \left\{\left(\frac{E_{seg}(I_{att})}{E_{mean}} > \beta_4\right) \text{ OR } \left(\left(\frac{E_{seg}(I_{att})}{E_{mean}} > \beta_5\right) \text{ AND } (\text{last\_class} = \text{UNVOICED})\right)\right\} \quad (8)$$

$$\text{then } I_{att2} = I_{att}$$

$$\text{otherwise } I_{att2} = 0$$

where $I_{att}$ was found in Equation (2) and $\beta_4$ and $\beta_5$ are thresholds being set, in this non-limitative example implementation, to $\beta_4=16$ and $\beta_5=12$, respectively. When the comparison operation 413 and comparator 463 determines that $I_{att2}=0$, no attack is detected.

The second-stage attack detection operation 410 finally comprises an energy comparison operation 414. To perform operation 414, the second-stage attack detector 460 comprises an energy comparator 464 to compare, in order to further reduce the number of falsely detected attacks when $I_{att2}$ as determined in the comparison operation 413 and comparator 463 is larger than 0, the following ratio with the following threshold as shown, for example, in Equation (9):

$$\text{if } \left\{\frac{E_{seg}(I_{att})}{E_{LT}} < \beta_6\right\} \text{ then } I_{att2} = 0 \quad (9)$$

where $\beta_6$ is a threshold set to $\beta_6=20$ in this non-limitative example implementation, and $E_{LT}$ is a long-term energy computed using, as a non-limitative example, Equation (10):

$$E_{LT} = \alpha \cdot E_{LT} + (1-\alpha) \cdot \frac{1}{N/K} \sum_{i=0}^{N/K-1} E_{seg}(i). \quad (10)$$

In this non-limitative example implementation, the parameter $\alpha$ is set to 0.95. Again, when $I_{att2}=0$, no attack is detected.

Finally, in the energy comparison operation 414, the energy comparator 464 set the attack position $I_{att2}$ to 0 if an attack was detected in the previous frame. In this case no attack is detected.

Final Attack Detection Decision

A final decision whether the current frame is determined as an attack frame to be coded using the TC coding mode is conducted based on the positions of the attacks $I_{att1}$ and $I_{att2}$ obtained during the first-stage 404 and second-stage 410 detection operations, respectively.

If the current frame is active (VAD=1) and previously classified for coding in the GC coding mode as determined in the decision operation 403 and decision module 453, the following logic of, for example, Equation (11) is applied:

$$\text{if } I_{att1} >= P$$

$$\text{then } I_{att,final} = I_{att1}$$

$$\text{else if } I_{att2} > 0$$

$$\text{then } I_{att,final} = I_{att2} \quad (11)$$

Specifically, the attack detecting method 400 comprises a first-stage attack decision operation 430. To perform operation 430, if the current frame is active (VAD=1) and previously classified for coding in the GC coding mode as determined in the decision operation 403 and decision module 453, the attack detector 450 further comprises a first-stage attack decision module 470 to determine if $I_{att1} \geq P$. If $I_{att1} \geq P$, then $I_{att1}$ is the position of the detected attack, in the last sub-frame of the current frame and is used to determine that the glottal-shape codebook of the TC coding mode is used in this last sub-frame. Otherwise, no attack is detected.

Regarding the second-stage attack detection, if the comparison of Equation (9) is true or if an attack was detected in the previous frame as determined in energy comparison operation 414 and energy comparator 464, then $I_{att2}=0$ and no attack is detected. Otherwise, in an attack decision operation 440 of the attack detecting method 400, an attack decision module 480 of the attack detector 450 determines that an attack is detected in the current frame at position $I_{att,final}=I_{att2}$. The position of the detected attack, $I_{att,final}$, is used to determine in which sub-frame the glottal-shape codebook of the TC coding mode is used.

The information about the final position $I_{att,final}$ of the detected attack is used to determine in which sub-frame of the current frame the glottal-shape codebook within the TC coding mode is employed and which TC mode configuration (see Reference [3]) is used. For example, in case of a frame of N=256 samples which is divided into four (4) sub-frames and N/K=32 analysis segments, the glottal-shape codebook is used in the first sub-frame if the final attack position $I_{att,final}$ is detected in segments 1-7, in the second sub-frame if the final attack position $I_{att,final}$ is detected in segments 8-15, in the third sub-frame if the final attack position $I_{att,final}$ is detected in segments 16-23, and finally in the last (fourth) sub-frame of the current frame if the final attack position $I_{att,final}$ is detected in segments 24-31. The value $I_{att,final}=0$ signals that an attack was not found and that the current frame is coded according to the original classification (usually using the GC coding mode).

Illustrative Implementation in an Immersive Voice/Audio Codec

The attack detecting method 400 comprises a glottal-shape codebook assignment operation 445. To perform operation 445, the attack detector 450 comprises a glottal-shape codebook assignment module 485 to assign the glottal-shape codebook within the TC coding mode to a given sub-frame of the current frame consisted from 4 sub-frames using the following logic of Equation (12):

$$sbfr = 4 \cdot \frac{I_{att,final}}{N/K} \tag{12}$$

where sbfr is the sub-frame index, sbfr=0, . . . 3, where index 0 denotes the first sub-frame, index 1 denotes the second sub-frame, index 2 denotes the third sub-frame, and index 3 denotes the fourth sub-frame.

The foregoing description of a non-limitative example of implementation supposes a pre-processing module operating at an internal sampling rate of 12.8 kHz, having four (4) sub-frames and thus frames having a number of samples N=256. If the core codec uses ACELP at the internal sampling rate of 12.8 kHz, the final attack position $I_{att,final}$ is assigned to the sub-frame as defined in Equation (12). However, the situation is different when the core codec operates at a different internal sampling rate, for example at higher bit-rates (16.4 kbps and more in the case of EVS) where the internal sampling rate is 16 kHz. Giving a frame length of 20 ms, the frame is composed in this case of 5 sub-frames and the length of such frame is $N_{16}$=320 samples. In this example of implementation, since the pre-processing classification and analysis might be still performed in the 12.8 kHz internal sampling rated domain, the glottal-shape codebook assignment module 485 selects, in the glottal-shape codebook assignment operation 445, the sub-frame to be coded using the glottal-shape codebook within the TC coding mode using the following logic of Equation (13):

$$sbfr = \left\lfloor 5 \cdot \frac{I_{att,final}}{N/K} \right\rfloor \tag{13}$$

where the operator $\lfloor x \rfloor$ indicates the largest integer less than or equal to x. In the case of Equation (13), sbfr=0, . . . 4 is different from Equation (12) while the number of analysis segments is the same as in Equation (12), i.e. N/K=32. Thus the glottal-shape codebook is used in the first sub-frame if the final attack position $I_{att,final}$ is detected in segments 1-6, in the second sub-frame if the final attack position $I_{att,final}$ is detected in segments 7-12, in the third sub-frame if the final attack position $I_{att,final}$ is detected in segments 13-19, in the fourth sub-frame if the final attack position $I_{att,final}$ is detected in segments 20-25, and finally in the last (fifth) sub-frame of the current frame if the final attack position $I_{att,final}$ is detected in segments 26-31.

Figure 5A:
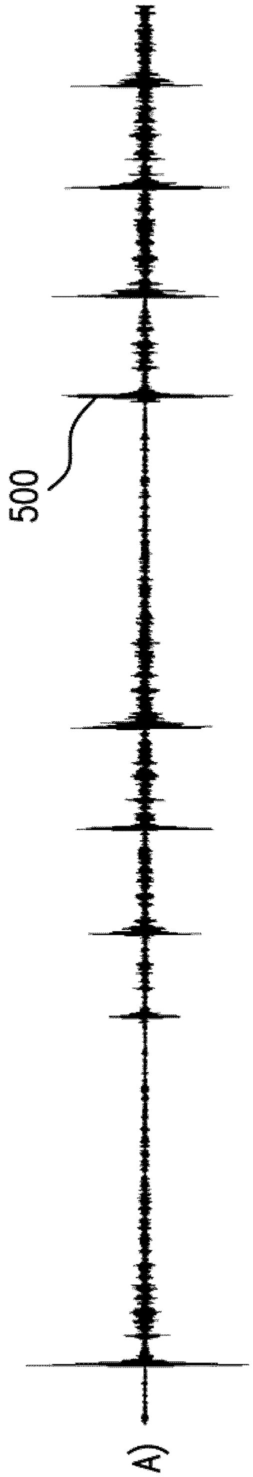
FIG. 5 is a graph of a first non-restrictive, illustrative example showing the impact of the attack detector of FIG. 4 and a TC (Transition Coding) coding mode on the quality of a decoded speech signal, wherein curve a) represents an input speech signal, curve b) represents a reference speech signal synthesis, and curve c) represents the improved speech signal synthesis when the attack detector of FIG. 4 and the TC coding mode are used for processing an onset frame.
Figure 5B:
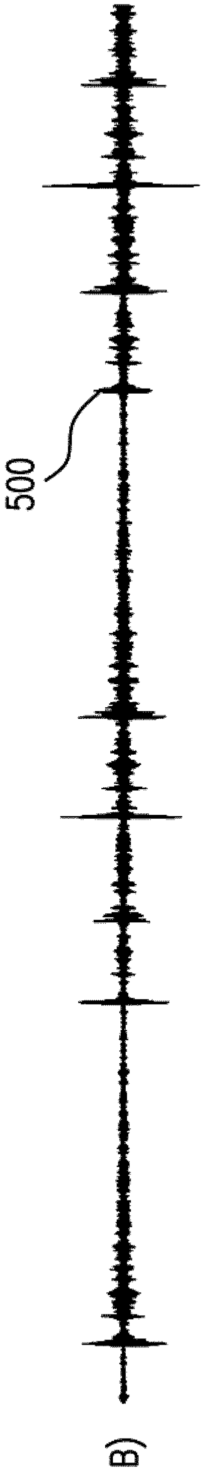
Figure 5C:
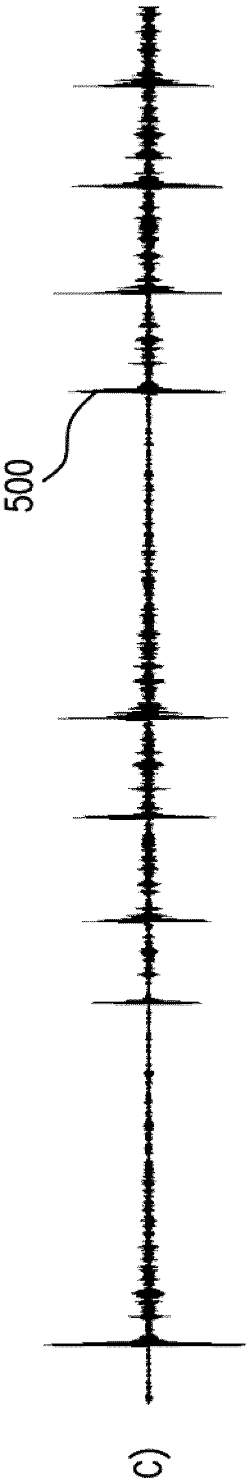

FIG. 5 is a graph of a first non-restrictive, illustrative example showing the impact of the attack detector of FIG. 4 and TC coding mode on the quality of a decoded music signal. Specifically, in FIG. 5, a music segment of castanets is shown, wherein curve a) represents the input (uncoded) music signal, curve b) represents a decoded reference signal synthesis when only the first-stage attack detection was employed, and curve c) represents the decoded improved synthesis when the whole first-stage and second-stage attack detections and coding using the TC coding mode are employed. Comparing curves b) and c), it can be seen that the attacks (low-to-high amplitude onsets such as 500 in FIG. 5) in the synthesis of curve c) are reconstructed significantly more accurate both in terms of preserving the energy and sharpness of the castanets signal at the beginning of onsets.

Figure 6:
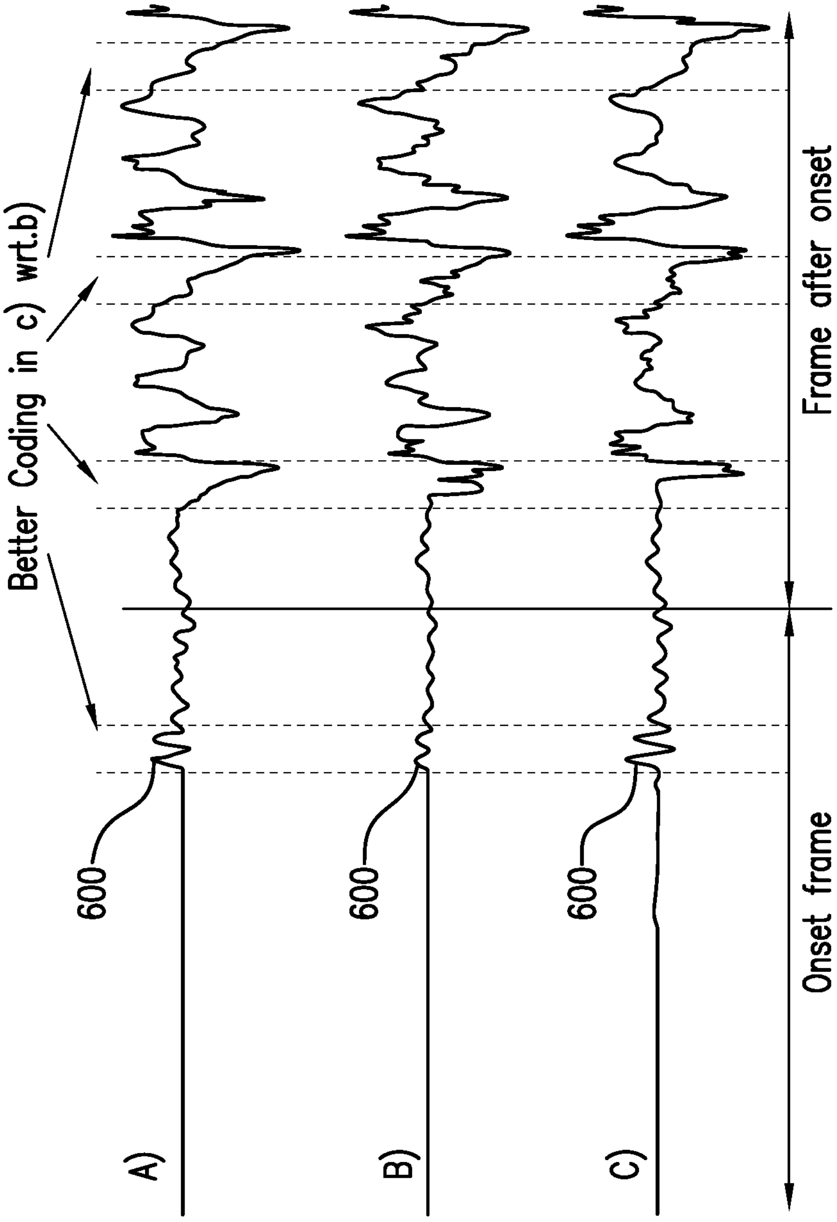
FIG. 6 is a graph of a second non-restrictive, illustrative example showing the impact of the attack detector of FIG. 4 and TC coding mode on the quality of a decoded speech signal, wherein curve a) represents an input speech signal, curve b) represents a reference speech signal synthesis, and curve c) represents the improved speech signal synthesis when the attack detector of FIG. 4 and the TC coding mode are used for processing an onset frame.

FIG. 6 is a graph of a second non-restrictive, illustrative example showing the impact of the attack detector of FIG. 4 and TC coding mode on the quality of a decoded speech signal, wherein curve a) represents an input (uncoded) speech signal, curve b) represents a decoded reference speech signal synthesis when an onset frame is coded using the GC coding mode, and curve c) represents a decoded improved speech signal synthesis when the whole first-stage and second-stage attack detection and coding using the TC coding mode are employed in the onset frame. Comparing curves b) and c), it can be seen that coding of the attacks (low-to-high amplitude onsets such as 600 in FIG. 6) is improved when the attack detection operation 400 and attack detector 450 and the TC coding mode are employed in the onset frame. Moreover, the frame after onset is coded using the GC coding mode both in curves b) and c) and it can be seen that the coding quality of the frame after onset is also improved in curve c). This is because the adaptive codebook in the GC coding mode in the frame after onset takes advantage of the well built excitation when the onset frame is coded using the TC coding mode.

Figure 7:
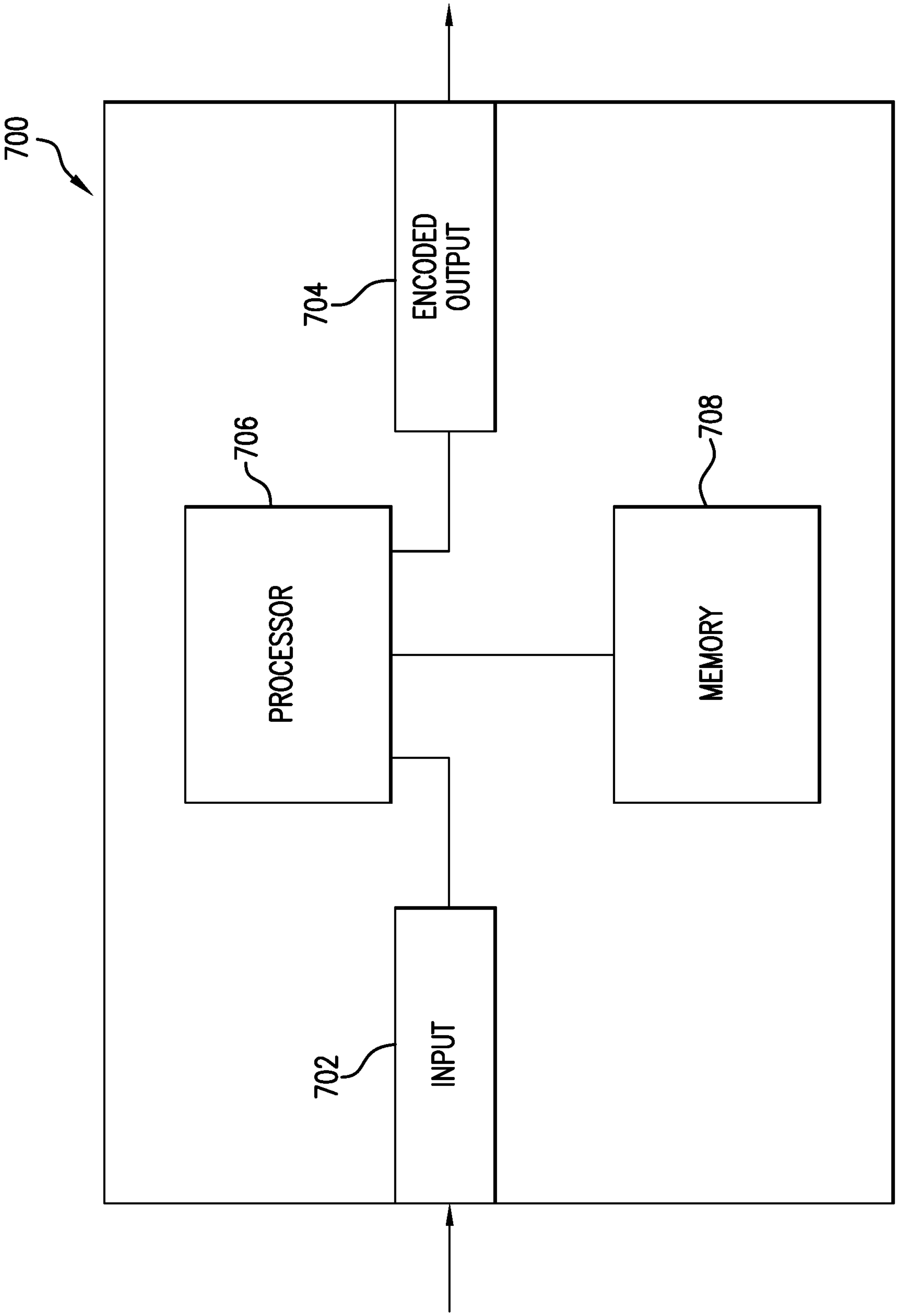
FIG. 7 is a simplified block diagram of an example configuration of hardware components for implementing the methods and devices for detecting an attack in a sound signal to be coded and for coding the detected attack.

FIG. 7 is a simplified block diagram of an example configuration of hardware components forming the devices for detecting an attack in a sound signal to be coded and for coding the detected attack and implementing the methods for detecting an attack in a sound signal to be coded and for coding the detected attack.

The devices for detecting an attack in a sound signal to be coded and for coding the detected attack may be implemented as a part of a mobile terminal, as a part of a portable media player, or in any similar device. The devices for detecting an attack in a sound signal to be coded and for coding the detected attack (identified as 700 in FIG. 7) comprises an input 702, an output 704, a processor 706 and a memory 708.

The input 702 is configured to receive for example the digital input sound signal 105 (FIG. 1). The output 704 is configured to supply the encoded bit-stream 111. The input 702 and the output 704 may be implemented in a common module, for example a serial input/output device.

The processor 706 is operatively connected to the input 702, to the output 704, and to the memory 708. The processor 706 is realized as one or more processors for executing code instructions in support of the functions of the various modules of the sound encoder 106, including the modules of FIGS. 2, 3 and 4.

The memory 708 may comprise a non-transient memory for storing code instructions executable by the processor 706, specifically a processor-readable memory comprising non-transitory instructions that, when executed, cause a processor to implement the operations and modules of the sound encoder 106, including the operations and modules of FIGS. 2, 3 and 4. The memory 708 may also comprise a random access memory or buffer(s) to store intermediate processing data from the various functions performed by the processor 706.

Those of ordinary skill in the art will realize that the descriptions of the methods and devices for detecting an attack in a sound signal to be coded and for coding the detected attack are illustrative only and are not intended to be in any way limiting. Other embodiments will readily suggest themselves to such persons with ordinary skill in the art having the benefit of the present disclosure. Furthermore, the disclosed methods and devices for detecting an attack in a sound signal to be coded and for coding the detected attack may be customized to offer valuable solutions to existing needs and problems related to allocation or distribution of bit-budget.

In the interest of clarity, not all of the routine features of the implementations of the methods and devices for detecting an attack in a sound signal to be coded and for coding the detected attack are shown and described. It will, of course, be appreciated that in the development of any such actual implementation of the methods and devices for detecting an attack in a sound signal to be coded and for coding the detected attack, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine, and those operations and sub-operations may be stored as a series of non-transitory code instructions readable by the processor, computer or machine, they may be stored on a tangible and/or non-transient medium.

Modules of the methods and devices for detecting an attack in a sound signal to be coded and for coding the detected attack as described herein may comprise software, firmware, hardware, or any combination(s) of software, firmware, or hardware suitable for the purposes described herein.

In the methods and devices for detecting an attack in a sound signal to be coded and for coding the detected attack as described herein, the various operations and sub-operations may be performed in various orders and some of the operations and sub-operations may be optional.

Although the present, foregoing disclosure is made by way of non-restrictive, illustrative embodiments, these embodiments may be modified at will within the scope of the appended claims without departing from the spirit and nature of the present disclosure.

REFERENCES

The following references are referred to in the present specification and the full contents thereof are incorporated herein by reference.

[1] V. Eksler, R. Salami, and M. Jelínek, "Efficient handling of mode switching and speech transitions in the EVS codec," in *Proc. IEEE Int. Conf. on Acoustics, Speech and Signal Processing* (*ICASSP*), Brisbane, Australia, 2015.

[2] V. Eksler, M. Jelínek, and R. Salami, "Method and Device for the Encoding of Transition Frames in Speech and Audio," WIPO Patent Application No. WO/2008/049221, 24 Oct. 2006.

[3] V. Eksler and M. Jelínek, "Glottal-Shape Codebook to Improve Robustness of CELP Codecs," *IEEE Trans. on Audio, Speech and Language Processing*, vol. 18, no. 6, pp. 1208-1217, August 2010.

[4] 3GPP TS 26.445: "Codec for Enhanced Voice Services (EVS); Detailed Algorithmic Description".

As additional disclosure, the following is the pseudo-code of a non-limitative example of the disclosed attack detector implemented in an Immersive Voice and Audio Services (IVAS) codec→

The pseudo-code is based on EVS. New IVAS logic is highlighted in shaded background.

```
void detector( . . . )
{
   attack_flag = 0;                                   /* initialization */
   attack = attack_det(. . .);                        /* attack detection */
   . . .
   if (localVAD == 1 && *coder_type == GENERIC && attack > 0 &&
!(*sp_aud_decision2 == 1 && ton > 0.65f))
   {
              /* change coder_type to TC if attack has been detected */
              *sp_aud_decision1 = 0;
              *sp_aud_decision2 = 0;
              *coder_type = TRANSITION;
|             *attack_flag = attack + 1;
   }
   return attack_flag;
}
static short attack_det(
   const float          *inp,            /* i  : input signal          */
   const short          last_clas,       /* i  : last signal clas      */
   const short          localVAD,        /* i  : local VAD flag        */
   const short          coder_type,      /* i  : coder type            */
   const long           total_brate,     /* i  : total bit-rate        */
   const short          element_mode,    /* i  : IVAS element mode     */
   const short          clas,            /* i  : signal class          */
```

-continued

```
    float finc_prev[ ],                                  /* i/o: previous fine           */
    float *lt_finc,                                      /* i/o: long-term mean fine     */
    short *last_strong_attack                            /* i/o: last strong attack flag */
)
{
    short i, attack;
    float etmp, etmp2, fine[ATT_NSEG];
    short att_3lsub_pos;
    short attack1;
    att_3lsub_pos = ATT_3LSUB_POS;
    if( total_brate >= ACELP_24k40 )
    {
            att_3lsu_pos = ATT_3LSUB_POS_16k; /* applicable only in EVS */
    }
    /* compute energy per section */
    for( i=0; i<ATT_NSEG; i++ )
    {
            finc[i] = sum2_f( inp + i*ATT_SEG_LEN, ATT_SEG_LEN );
    }
    attack = maximum( finc, ATT_NSEG, &etmp );
    attack1 = attack;
    if( localVAD == 1 && coder_type == GENERIC )
    {
            /* compute mean energy in the first three sub-frames */
            etmp = mean( finc, att_3lsub_pos );
            /* compute mean energy after the attack */
            etmp2 = mean( finc + attack, ATT_NSEG - attack );
            /* and compare them */
            if( etmp * 8 > etmp2 )
            {
                /* stop, if the attack is not sufficiently strong */
                attack = 0;
            }
            if( last_clas == VOICED_CLAS && etmp * 20 > etmp2 )
            {
                /* stop, if the signal was voiced and the attack is not
  sufficiently strong*/
                attack = 0;
            }
            /* compare wrt. other sections (reduces miss-classification) */
            if( attack > 0 )
            {
                etmp2 = fine[attack];
                for( i=2; i<att_3lsub_pos-2; i++ )
                {
                        if( finc[i] * 2.0f > etmp2 )
                        {
                          /* stop, if the attack is not sufficiently strong */
                          attack = 0;
                          break;
                        }
                }
            }
            if( attack == 0 && element_mode > EVS_MONO && (clas <
  VOICED_TRANSITION || clas == ONSET) )
            {
                mvr2r( finc, finc_prev, attack1 );
                /* compute mean energy before the attack */
                etmp = mean( finc_prev, ATT_NSEG );
                etmp2 = finc[attack1];
                if((etmp * 16 < etmp2) || (etmp * 12 < etmp2 && last_clas ==
  UNVOICED_CLAS))
                {
                        attack = attack1;
                }
                if( 20 * *lt_finc > etmp2 || *last_strong_attack )
                {
                        attack = 0;
                }
            }
            *last_strong_attack = attack;
    }
    /* compare wrt. other sections (reduces miss-classification) */
    else if( attack > 0 )
    {
            etmp2 = finc[attack];
            for( i=2; i<att_3lsub_pos-2; i++ )
            {
                if( i != attack && finc[i] * 1.3f > etmp2 )
```

-continued

```
                {
                                /* stop, if the attack is not sufficiently strong */
                                attack = 0;
                                break;
                }
            }
            *last__strong__attack = 0;
    }
    /* updates */
    mvr2r( finc, finc__prev, ATT__NSEG );
    *lt__finc = 0.95f * *lt__finc + 0.05f * mean( fine, ATT__NSEG );
    return attack;
}
/* function to determine the sub-frame with glottal-shape codebook in TC mode
frame */
void tc__classif__enc(
    const short L__frame,             /* i : length of the frame                */
            short *tc__subfr,         /* o : TC sub-frame index                 */
            short *position,          /* o : maximum of residual signal index   */
    const short attack__flag,         /* i : attack flag                        */
    const short T__op[ ],             /* i : open loop pitch estimates          */
    const float *res                  /* i : LP residual signal                 */
)
{
    float temp;
    *tc__subfr = −1;
    if( attack__flag )
    {
            *tc__subfr = 3*L__SUBFR;
            if( attack__flag > 0 )
            {
                if( L__frame == L__FRAME )
                {
                                *tc__subfr = NB__SUBFR * (attack__flag-1) / 32 /*ATT__NSEG*/;
                }
                else
                {
                                *tc__subfr = NB__SUBFR16k * (attack__flag-1) / 32 /*ATT__NSEG*/;
              }
                *tc__subfr *= L__SUBFR;
            }
    }
    if( attack__flag )
    {
            *position = emaximum( res + *tc__subfr,min(T__op[0]+2,L__SUBFR), &temp )
+ *tc__subfr;
    }
    else
. . .
```

What is claimed is:

1. A device for detecting an attack in a sound signal to be coded wherein the sound signal is processed in successive frames each including a number of sub-frames and each being segmented into a plurality of analysis segments, comprising:

at least one processor; and a memory coupled to the processor and storing non-transitory instructions that when executed cause the processor to implement:

a calculator of an energy of the sound signal in the plurality of analysis segments in a current frame, and a finder of one of the analysis segments with maximum energy representing a candidate attack position;

a first-stage attack detector for detecting the attack in a last sub-frame of the current frame; and a second-stage attack detector for detecting the attack in one of the sub-frames of the current frame, including the sub-frames preceding the last sub-frame, wherein the second-stage attack detector is used only if no attack is detected by the first-stage attack detector and comprises:

a calculator of a mean energy of the sound signal across analysis segments before the analysis segment of the current frame with maximum energy representing the candidate attack position; and a first comparator of a ratio between the energy of the analysis segment representing a candidate attack position and the calculated mean energy to a threshold.

2. An attack detecting device according to claim 1, wherein the non-transitory instructions stored in the memory cause the processor to implement a decision module for determining that the current frame is an active frame previously classified to be coded using a generic coding mode, and for indicating that no attack is detected when the current frame is not determined as an active frame previously classified to be coded using a generic coding mode.

3. An attack detecting device according to claim 1, wherein the first-stage attack detector comprises:

a calculator of a first average energy across the analysis segments before the last subframe in the current frame; and a calculator of a second average energy across the analysis segments of the current frame starting with the analysis segment with maximum energy to a last analysis segment of the current frame.

4. An attack detecting device according to claim 3, wherein the first-stage attack detector comprises:

a first comparator of a ratio between the first average energy and the second average energy to:

a first threshold; or a second threshold when a classification of a previous frame is VOICED.

5. An attack detecting device according to claim 4, wherein the first-stage attack detector comprises, when the comparison by the first comparator indicates that a first-stage attack is detected:

a second comparator of a ratio between the energy of the analysis segment of maximum energy and the energy of other analysis segments of the current frame with a third threshold.

6. An attack detecting device according to claim 5, wherein the non-transitory instructions stored in the memory cause the processor to implement, when the comparisons by the first and second comparators indicate that a first-stage attack position is the analysis segment with maximum energy representing a candidate attack position:

a decision module for determining if the first-stage attack position is equal to or larger than a number of analysis segments before the last sub-frame of the current frame and, if the first-stage attack position is equal to or larger than the number of analysis segments before the last sub-frame, determining the position of the detected attack as the first-stage attack position in the last sub-frame of the current frame.

7. An attack detecting device according to claim 1, wherein the non-transitory instructions stored in the memory cause the processor to implement a decision module for determining if the current frame is classified as VOICED, and wherein the second-stage attack detector is used when the current frame is not classified as VOICED.

8. An attack detecting device according to claim 1, wherein the analysis segments before the analysis segment with maximum energy representing a candidate attack position comprise analysis segments from a previous frame.

9. An attack detecting device according to claim 1, wherein the first comparator compares the ratio between the energy of the analysis segment representing a candidate attack position and the calculated mean energy to:

a first threshold; or a second threshold when a classification of a previous frame is UNVOICED.

10. An attack detecting device according to claim 9, wherein the second-stage attack detector comprises, when the comparison by the first comparator of the second-stage attack detector indicates that a second-stage attack is detected:

a second comparator of a ratio between the energy of the analysis segment representing a candidate attack position and a long-term energy of the analysis segments to a third threshold.

11. An attack detecting device according to claim 10, wherein the second comparator of the second-stage attack detector detects no attack when an attack was detected in the previous frame.

12. An attack detecting device according to claim 10, wherein the non-transitory instructions stored in the memory cause the processor to implement, when the comparisons by the first and second comparators of the second-stage attack detector indicates that a second-stage attack position is the analysis segment with maximum energy representing a candidate attack position:

a decision module for determining the position of the detected attack as the second-stage attack position.

13. A device for coding an attack in a sound signal, comprising:

the attack detecting device according to claim 1; and an encoder of the sub-frame comprising the detected attack using a coding mode with a non-predictive codebook.

14. An attack coding device according to claim 13, wherein the coding mode is a transition coding mode.

15. An attack coding device according to claim 14, wherein the non-predictive codebook is a glottal-shape codebook populated with glottal impulse shapes.

16. An attack coding device according to claim 14, wherein the attack detecting device determines the sub-frame coded with the transition coding mode based on the position of the detected attack.

17. A device for detecting an attack in a sound signal to be coded wherein the sound signal is processed in successive frames each including a number of sub-frames and each being segmented into a plurality of analysis segments, comprising:

at least one processor; and a memory coupled to the processor and storing non-transitory instructions that when executed cause the processor to:

calculate an energy of the sound signal in the plurality of analysis segments in a current frame, and find one of the analysis segments with maximum energy representing a candidate attack position;

detect, in a first-stage, the attack positioned in a last sub-frame of the current frame; and detect, in a second-stage, the attack positioned in a sub-frame of the current frame preceding the last sub-frame, wherein the second-stage attack detection is used only if no attack is detected by the first-stage attack detection and comprises:

calculating a mean energy of the sound signal across analysis segments before the analysis segment of the current frame with maximum energy representing the candidate attack position; and comparing a ratio between the energy of the analysis segment representing a candidate attack position and the calculated mean energy to a threshold.

18. A method for detecting an attack in a sound signal to be coded wherein the sound signal is processed in successive frames each including a number of sub-frames and being segmented into a plurality of analysis segments, comprising:

calculating an energy of the sound signal in the plurality of analysis segments in a current frame and finding one of the analysis segments with maximum energy representing a candidate attack position;

a first-stage attack detection for detecting the attack in a last sub-frame of the current frame; and a second-stage attack detection for detecting the attack in one of the sub-frames of the current frame, including the sub-frames preceding the last sub-frame, wherein the second-stage attack detection is used only if no attack is detected by the first-stage attack detection and comprises:

calculating a mean energy of the sound signal across analysis segments before the analysis segment of the current frame with maximum energy representing the candidate attack position; and comparing, using a first comparator, a ratio between the energy of the analysis segment representing the candidate attack position and the calculated mean energy to a threshold.

19. An attack detecting method according to claim 18, comprising determining that the current frame is an active frame previously classified to be coded using a generic coding mode, and indicating that no attack is detected when the current frame is not determined as an active frame previously classified to be coded using a generic coding mode.

20. An attack detecting method according to claim 18, wherein the first-stage attack detection comprises:

calculating a first average energy across the analysis segments before the last sub-frame in the current frame; and calculating a second average energy across the analysis segments of the current frame starting with the analysis segment with maximum energy to a last analysis segment of the current frame.

21. An attack detecting method according to claim 20, wherein the first-stage attack detection comprises:

comparing, using a first comparator, a ratio between the first average energy and the second average energy to:

a first threshold; or a second threshold when a classification of a previous frame is VOICED.

22. An attack detecting method according to claim 21, wherein the first-stage attack detection comprises, when the comparison by the first comparator indicates that a first-stage attack is detected:

comparing, using a second comparator, a ratio between the energy of the analysis segment of maximum energy and the energy of other analysis segments of the current frame with a third threshold.

23. An attack detecting method according to claim 22, comprising, when the comparisons by the first and second comparators indicate that a first-stage attack position is the analysis segment with maximum energy representing a candidate attack position:

determining if the first-stage attack position is equal to or larger than a number of analysis segments before the last sub-frame of the current frame and, if the first-stage attack position is equal to or larger than the number of analysis segments before the last sub-frame, determining the position of the detected attack as the first-stage attack position in the last subframe of the current frame.

24. An attack detecting method according to claim 18, comprising determining if the current frame is classified as VOICED, wherein the second-stage attack detection is used when the current frame is not classified as VOICED.

25. An attack detecting method according to claim 18, wherein the analysis segments before the analysis segment with maximum energy representing a candidate attack position comprise analysis segments from a previous frame.

26. An attack detecting method according to claim 18, wherein the comparison, using the first comparator, comprises comparing the ratio between the energy of the analysis segment representing a candidate attack position and the calculated mean energy to:

a first threshold; or a second threshold when a classification of a previous frame is UNVOICED.

27. An attack detecting method according to claim 26, wherein the second-stage attack detection comprises, when the comparison by the first comparator of the second-stage attack detection indicates that a second-stage attack is detected:

comparing, using a second comparator, a ratio between the energy of the analysis segment representing a candidate attack position and a long-term energy of the analysis segments to a third threshold.

28. An attack detecting method according to claim 27, wherein the comparison by the second comparator of the second-stage attack detection detects no attack when an attack was detected in the previous frame.

29. An attack detecting method according to claim 27, comprising, when the comparisons by the first and second comparators of the second-stage attack detection indicates that a second-stage attack position is the analysis segment with maximum energy representing a candidate attack position:

determining the position of the detected attack as the second-stage attack position.

30. A method for coding an attack in a sound signal, comprising:

the attack detecting method according to claim 18; and encoding the sub-frame comprising the detected attack using a coding mode with a non-predictive codebook.

31. An attack coding method according to claim 30, wherein the coding mode is a transition coding mode.

32. An attack coding method according to claim 31, wherein the non-predictive codebook is a glottal-shape codebook populated with glottal impulse shapes.

33. An attack coding method according to claim 31, comprising determining the sub-frame coded with transition coding mode based on the position of the detected attack.

* * * * *